Aug. 29, 1944.　　　　B. S. CAIN　　　　2,357,081
RESTRAINT AND EQUALIZING DEVICE
Original Filed July 22, 1942
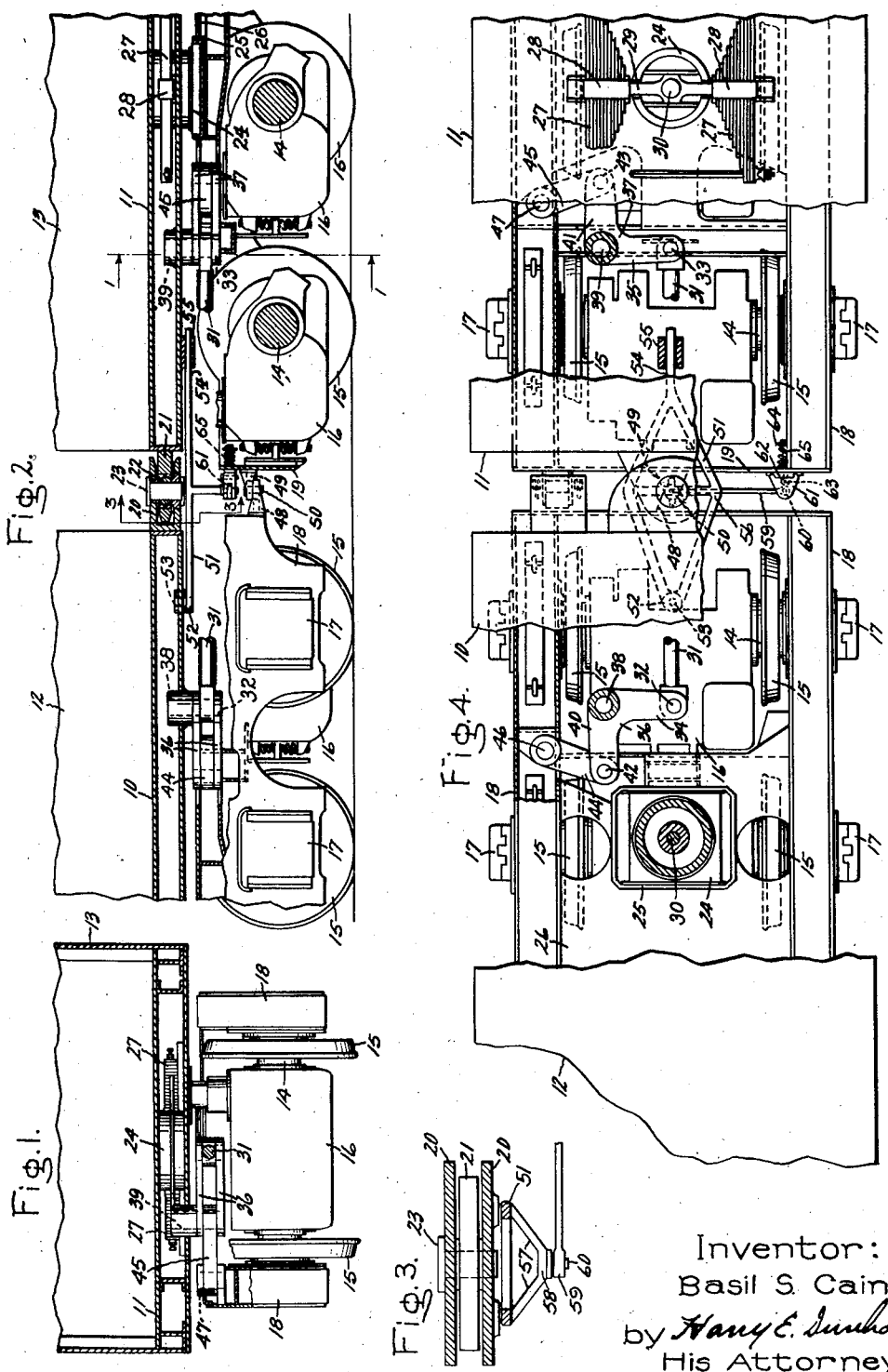
Inventor:
Basil S. Cain,
by Harry E. Dunham
His Attorney.

Patented Aug. 29, 1944

2,357,081

UNITED STATES PATENT OFFICE 2,357,081

RESTRAINT AND EQUALIZING DEVICE

Basil S. Cain, Erie, Pa., assignor to General Electric Company, a corporation of New York Original application July 22, 1942, Serial No. 451,868. Divided and this application April 14, 1943, Serial No. 483,038

4 Claims. (Cl. 105—176)

My invention relates to restraint and equalizing devices such as are used in connection with railway vehicles.

This application is a division of my copending application Serial No. 451,868, filed July 22, 1942.

An object of my invention is to provide an improved restraint device for vehicles which are connected together by an articulating joint.

Another object of my invention is to provide an improved restraint and equalizing device for articulated vehicle frames supported by trucks.

A further object of my invention is to provide an improved restraint device for articulated vehicle frames which are supported by trucks connected together by an articulating joint.

Further objects and advantages of my invention will become apparent and my invention will be better understood from the accompanying drawing, and the features of novelty which characterize my invention will be pointed out with particularity in the claims annexed to and forming part of this specification.

In the drawing Fig. 1 is an end elevational sectional view along line 1—1 of Fig. 2 showing a part of a railway vehicle provided with an embodiment of my invention; Fig. 2 is a partial side elevational sectional view of a pair of articulated railway vehicles provided with the embodiment of my invention shown in Fig. 1; Fig. 3 is a sectional view taken along line 3—3 of Fig. 2; and Fig. 4 is a partial plan view of the construction shown in Fig. 2.

Referring to the drawing, I have shown a pair of railway vehicles provided with vehicle frames 10 and 11 arranged to support vehicle superstructures 12 and 13, respectively. These vehicles are provided with a plurality of driving axles 14 supported by driving wheels 15 and arranged to be driven by electric motors 16. The ends of the axles 14 are arranged in journal boxes 17 which support the side frames 18 of driving trucks. These driving trucks are provided with end frames 19 which rigidly secure together the ends of the truck side frames 18. The two vehicle frames are connected together by an articulating joint comprising a pair of tongues 20 secured to the vehicle frame 10 and between which a tongue 21 is arranged which is secured to the vehicle frame 11. The tongue 21 is provided with a spherical bearing 22 in which is arranged a pin 23 which secures together the tongues 20 and 21 for transmitting longitudinal forces therebetween. Each of the vehicle frames is supported on the truck frames by a suitable transversely slidable conventional center plate 24 which is mounted on a center bearing 25 supported by a transverse bolster 26 on the truck frame as shown at the right in Fig. 2 and at the left in Fig. 4. The center plate 24 extends upwardly within the vehicle frame and a lateral restraint device is arranged to restrain lateral movement of the center plate relative to the truck frame. This center plate restraint device includes two sets of leaf springs 27 arranged on opposite longitudinal sides of the center plate and held together by spring straps 28 arranged in engagement with the ends of a guide 29 secured to a center pin 30 which is arranged centrally of the center plate 24 and is secured to the truck frame bolster 26 as shown at the right in Figs. 2 and 4. Relative lateral movement between the truck frame and the vehicle frame results in a relative movement between the center plate 24 and the springs 27 and spring straps 28 such that these springs are deflected and tend to return the center plate 24 to a central position about the center pin 30.

A restraint device is provided for transmitting lateral forces between the trucks and vehicle frames in an equalized manner and for minimizing relative movement between the two vehicles and the vehicle trucks to provide for a smoother operation of the train. This restraint device includes a guiding linkage provided with a tie bar 31 which extends between adjacent ends of the end trucks of the two vehicles and is pivotally connected adjacent each end thereof by pivot pins 32 and 33 to transversely extending arms 34 and 35 of bell cranks 36 and 37, respectively. These bell cranks are pivotally connected by pivot pins 38 and 39 to the vehicle frames 10 and 11 and are provided with longitudinally extending arms 40 and 41 which are pivotally secured by pivot pins 42 and 43 to the ends of links 44 and 45. These bell cranks and links are arranged adjacent the same side of both of the vehicles, and the links 44 and 45 are pivotally secured to the truck side frames 18 by pivot pins 46 and 47 as shown in Fig. 4. With this arrangement forces are transmitted from the vehicle frames to the truck frames through the pairs of bell crank arms and the tie bar, such that transverse movement of one of the truck frames to one side relative to its supported vehicle frame will produce a corresponding and opposite transverse movement of the other truck frame relative to its supported vehicle frame. This facilitates guiding of the trailing vehicle into curves by the relative movement of the leading vehicle frame relative to its supporting truck and equalizes the forces on the trucks except for the bias exerted by the springs which act on one or both center plates. While it may be convenient to provide lateral restraint springs on both the center plates as shown, it is not necessary to provide more than one, applied to either center plate adjacent to the bell crank and link connection. The bell crank and link connection acts as an equalizer between the lateral movements of the two center plates, so that a spring restraint on either will act as a restraint on the whole system. The adjacent ends of the end trucks on the two vehicles are connected together by an articulating coupling including tongues 48 and 49 mounted on the end frames 19 of the trucks and pivotally secured together by an articulation pin 50 with adequate longitudinal clearance for operation on curves. This equalizing device, including the two bell cranks and connecting rod 31 combined with the articulated joint 23, provides a completely determinate equalizing system for the two car bodies on the two trucks, and this combination will guide into and out of curves even if the center plate restraint springs 27 were omitted entirely. These springs act to steady the motion and minimize oscillations due to track variations as well as functioning to center the car bodies if they be disconnected, as for maintenance work. Nosing of the trucks is minimized by a nosing restraint mechanism which includes a double triangular shaped equalizing frame 51 which is pivotally secured adjacent one end 52 thereof by a pivot pin 53 to the under side of the vehicle frame 10 substantially along the longitudinal center line of the vehicle. The other end of the equalizing frame 51 is provided with a longitudinally extending tongue 54 which slidably engages a bearing 55 formed with curved bearing surfaces to provide a universal connection between the equalizing frame 51 and the vehicle frame 11. This connection also is arranged substantially along the longitudinal center line of the vehicle frame. The outer corners 56 of the equalizing frame 51 are connected together by downwardly extending arms 57 which are joined together at their lower end by a transversely extending bar 58 and are pivotally connected to a rocker bar or link 59 by a pivot pin 60 arranged substantially midway between the ends of the equalizer frame 51 and along the longitudinal center line of the equalizing frame. The rocker bar 59 is pivotally secured adjacent its other end by a pivot pin 60 to a rocker 61 which is seated on a pair of rocker seats 62 mounted on the end frame 19 of one of the trucks. Thus, the equalizing frame 51 is connected to both of the vehicle frames 10 and 11 and to one of the trucks through the rocker mechanism. The rocker 61 is biased into engagement with the rocker seats 62 by a resilient mechanism including a tension bar 63 which extends through an opening in the rocker seats 62 and then through the end frame 19 and is provided with a retaining spring seat 64 for retaining a coil spring 65 under compression between the end frame 19 and the spring seat 64, and the locations of the pivot pin 53 and the bearing 55 are chosen so that when the vehicle is on any uniform curve, there is no substantial deflection of the spring 64. This spring and rocker arrangement provides for cushioning of relative movements between the truck frames and the vehicle frames and steadies the trucks in their normal position on tangent track and on uniform curves, and on turnouts or irregular curves the cushioning device allows the trucks to follow smoothly any irregularities in the track. This entire restraint device construction provides for ease in guiding the trailing articulated vehicle by movement of the leading vehicle and minimizes undesirable nosing and relative movements between the supporting trucks and the vehicle frames.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A restraint device for vehicles having a pair of vehicle frames and having an articulating connection between said vehicle frames with a truck for each of said vehicle frames, each of said trucks having a truck frame, a laterally movable center plate for supporting each of said vehicle frames, a guiding linkage including a tie bar extending between adjacent ends of said trucks, means for connecting said tie bar adjacent each end thereof to the adjacent vehicle frame and truck frame adjacent one side thereof, said connecting means including a bell crank having a pair of arms, means for pivotally connecting one of said crank arms to the adjacent end of said tie bar, means for pivotally connecting said bell crank to the adjacent vehicle frame, and means including a link pivotally connected to one side of said truck frame and pivotally connected to the other of said bell crank arms for transmitting forces between said bell crank and said truck frame.

2. A restraint device for vehicles having a pair of vehicle frames and having an articulating connection between said vehicle frames with a truck for each of said vehicle frames, each of said trucks having a truck frame, and a center plate on said vehicle frames for supporting said vehicle frames on said truck frames, a guiding linkage including a tie bar extending between adjacent ends of said trucks, means for connecting said tie bar adjacent each end thereof to the adjacent vehicle frame and truck frame adjacent one side thereof, said connecting means including a bell crank having an arm extending longitudinally and an arm extending transversely of said vehicle, means for pivotally connecting said transversely extending crank arm to the adjacent end of said tie bar, means for pivotally connecting said bell crank to the adjacent vehicle frame, means including a link pivotally connected to one side of said truck frame and pivotally connected to said longitudinally extending bell crank arm for transmitting forces between said bell crank and said truck frame, and means for resiliently centering each of said center plates relative to said truck frames.

3. A restraint device for vehicles having a pair of vehicle frames and having an articulating connection between said vehicle frames with a truck for each of said vehicle frames, each of said trucks having a truck frame, a guiding linkage including a tie bar extending between adjacent ends of said trucks, means for connecting said tie bar adjacent each end thereof to the adjacent vehicle frame and truck frame adjacent one side thereof, said connecting means including a bell crank having a pair of arms, means for pivotally connecting one of said crank arms to the adjacent end of said tie bar, means for pivotally connecting said bell crank to the adjacent vehicle frame, means including a link pivotally connected to one side of said truck frame and pivotally connected to the other of said bell crank arms for transmitting forces between said bell crank and said truck frame, and means including an articulating connection for coupling together adjacent ends of said truck frames.

4. A restraint device for vehicles having a pair of vehicle frames and having an articulating connection between said vehicle frames with a truck for each of said vehicle frames, each of said trucks having a truck frame, a guiding linkage including a tie bar extending between adjacent ends of said trucks, means for connecting said tie bar adjacent each end thereof to the adjacent vehicle frame and truck frame adjacent one side thereof, said connecting means including a bell crank having an arm extending longitudinally and an arm extending transversely of said vehicle, means for pivotally connecting said transversely extending crank arm to the adjacent end of said tie bar, means for pivotally connecting said bell crank to the adjacent vehicle frame, means including a link pivotally connected to one side of said truck frame and pivotally connected to said longitudinally extending bell crank arm for transmitting forces between said bell crank and said truck frame, and means including an articulating connection for coupling together adjacent ends of said truck frames.

BASIL S. CAIN.